United States Patent
Xu

(10) Patent No.: US 8,010,165 B2
(45) Date of Patent: Aug. 30, 2011

(54) MOBILE COMMUNICATION DEVICE AND AN INCOMING CALLER NUMBER PROMPT METHOD THEREOF

(75) Inventor: Xin Xu, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 307 days.

(21) Appl. No.: 12/407,146

(22) Filed: Mar. 19, 2009

(65) Prior Publication Data

US 2010/0069124 A1 Mar. 18, 2010

(30) Foreign Application Priority Data

Sep. 12, 2008 (CN) .......................... 2008 1 0304487

(51) Int. Cl.
*H04M 1/00* (2006.01)

(52) U.S. Cl. ..................................... 455/567; 455/412.2

(58) Field of Classification Search .................. 455/90.1, 455/412.1–2, 415, 550.1, 551, 566, 567, 455/572, 575.1
See application file for complete search history.

(56) References Cited

U.S. PATENT DOCUMENTS

| | | | | |
|---|---|---|---|---|
| 6,466,782 B2 * | 10/2002 | Ishikawa et al. | ........... | 455/412.2 |
| 7,904,274 B2 * | 3/2011 | Shimaoka et al. | ............ | 702/160 |
| 2002/0065087 A1 * | 5/2002 | Ishikawa et al. | .............. | 455/458 |
| 2005/0181769 A1 * | 8/2005 | Kogawa | ........................ | 455/413 |
| 2007/0086064 A1 * | 4/2007 | Koyama | ........................ | 358/402 |
| 2009/0221262 A1 * | 9/2009 | Miwa et al. | ................ | 455/404.1 |
| 2009/0286571 A1 * | 11/2009 | Liu | ............................ | 455/556.1 |

* cited by examiner

*Primary Examiner* — Cong Tran

(74) *Attorney, Agent, or Firm* — Altis Law Group, Inc.

(57) ABSTRACT

A mobile communication device comprising a transceiver module used for receiving an incoming caller number; a switch module; a power source; a keypad including a plurality of keys electronically connected to the switch module; a control module electronically connected to the transceiver module, the switch module and the keypad, the control module controlling the switch module to make the keys corresponding to the incoming caller number vibrate to prompt the incoming caller number. An incoming caller number prompt method of the mobile communication device is also provided.

7 Claims, 3 Drawing Sheets

MOBILE COMMUNICATION DEVICE AND AN INCOMING CALLER NUMBER PROMPT METHOD THEREOF

CROSS-REFERENCE TO RELATED APPLICATION

This application is related to a co-pending U.S. patent application Ser. No. 12/407,163, entitled "KEY BUTTON AND KEY ASSEMBLY USING THE KEY BUTTON AND PORTABLE ELECTRONIC DEVICE USING THE KEYPAD ASSEMBLY", by Xin Xu. Such application has the same assignee as the present application and is concurrently filed herewith. The disclosure of the above-identified application is incorporated herein by reference.

BACKGROUND OF THE INVENTION

1. Field of the Invention

The present invention relates to mobile communication devices, particularly to a mobile communication device with an incoming caller number prompt function and an incoming caller number prompt method thereof.

2. Description of related art

With development of the wireless communication technology, mobile communication devices, such as mobile handsets have been increasingly widely used with a multiplicity of functions. A caller number prompt function may be provided by the communication service provider. With the caller number prompt, the caller number can be identified before a call is received.

Usually, the incoming caller number prompt includes displaying the incoming number in the liquid crystal display (LCD), handset vibrating and ringing. When viewing the handset is inconvenient or the occasion requires quiet, the mobile handset usually is set in vibrating mode or silent mode.

Therefore, there is room for improvement within the art.

BRIEF DESCRIPTION OF THE DRAWINGS

Many aspects of the mobile communication device with an incoming caller number prompt function and the incoming caller number prompt method thereof can be better understood with reference to the following drawings. These drawings are not necessarily drawn to scale, the emphasis instead being placed upon clearly illustrating the principles of the mobile communication device with an incoming caller number prompt function and the incoming caller number prompt method thereof. Moreover, in the drawings like reference numerals designate corresponding parts throughout the several views. Wherever possible, the same reference numbers are used throughout the drawings to refer to the same or like elements of an embodiment.

DETAILED DESCRIPTION OF EXEMPLARY EMBODIMENTS

Figure 1:
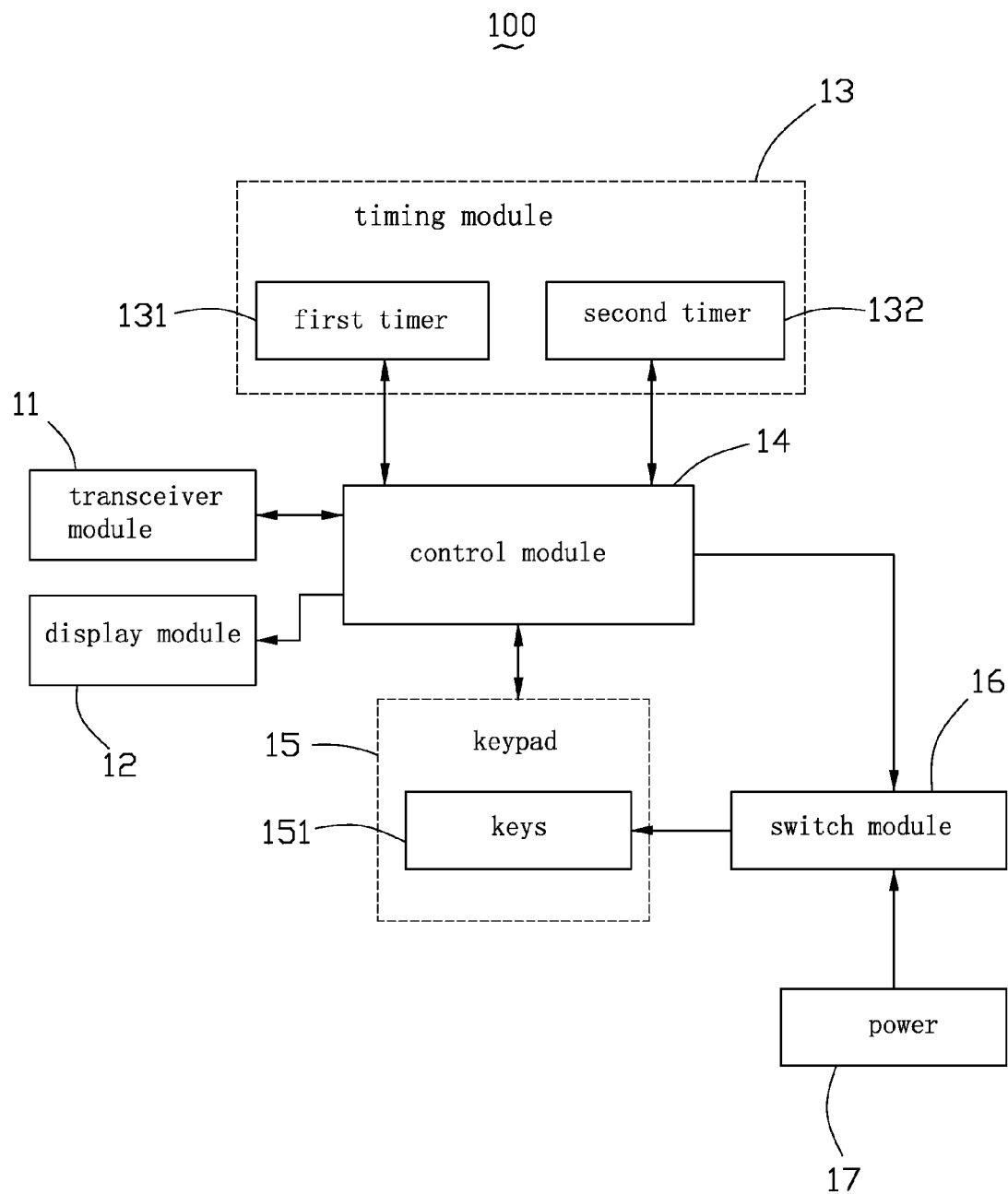
FIG. 1 is a block diagram of a mobile communication device in accordance with an exemplary embodiment.

Referring to FIG. 1, the present mobile communication device 100 includes a transceiver module 11, a display module 12, a timing module 13, a control module 14, a keypad 15, a switch module 16 and access to a source of power 17. Each of the transceiver 11, the display module 12, the timing module 13, the keypad 15 and the switch module 16 electronically connects to the control module 14. Also, the power 17, the switch module 16 and the keypad 15 are electronically connected to each other.

The transceiver module 11 receives an incoming call signal, and sends the incoming call signal to the control module 14. The display module 12 displays an incoming caller number and other information of the mobile communication device 100.

The timing module 13 includes a first timer 131 and a second timer 132. Both of the first timer 131 and the second timer 132 are electronically connected to the control module 14. The first timer 131 has a set time saved therein used to control a vibrating time of the keypad 15 corresponding to each symbol of an incoming caller number. The second timer 132 has another set time used to control an interval between two periods of the keypad 15 vibrating all symbols of the incoming caller number.

The control module 14 receives an incoming caller number from the transceiver module 11, and controls the display module 12 to display the incoming caller number. The control module 14 also controls the switch module 16 according to the time set by the timing module 13. When the keypad 15 is vibrating, if the user connects or hangs up the incoming call, the control module 14 controls the switch module 16 to stop the keypad 15 from vibrating.

The keypad 15 is electronically connected to the control module 14. The keypad 15 is used to input information. The keypad 15 includes a plurality of keys 151 corresponding to different symbols (e.g., numbers and/or letters), as well known in the art. The keys 151 are connected to the switch module 16 and switched by the switch module 16 to be powered on and off. When one of the keys 151 is powered on, a mechanism (not shown) makes its height different from when the key 151 powered off, so that each of the keys 151 is frequently powered on and off, the key 151 vibrates.

When a call is connected, the switch module 16 switches the keys 151 associated with the symbols corresponding to the incoming caller number to connect and disconnect to the power 17 in a predetermined frequency for forming a vibrating state to prompt the incoming caller number.

Figure 2:
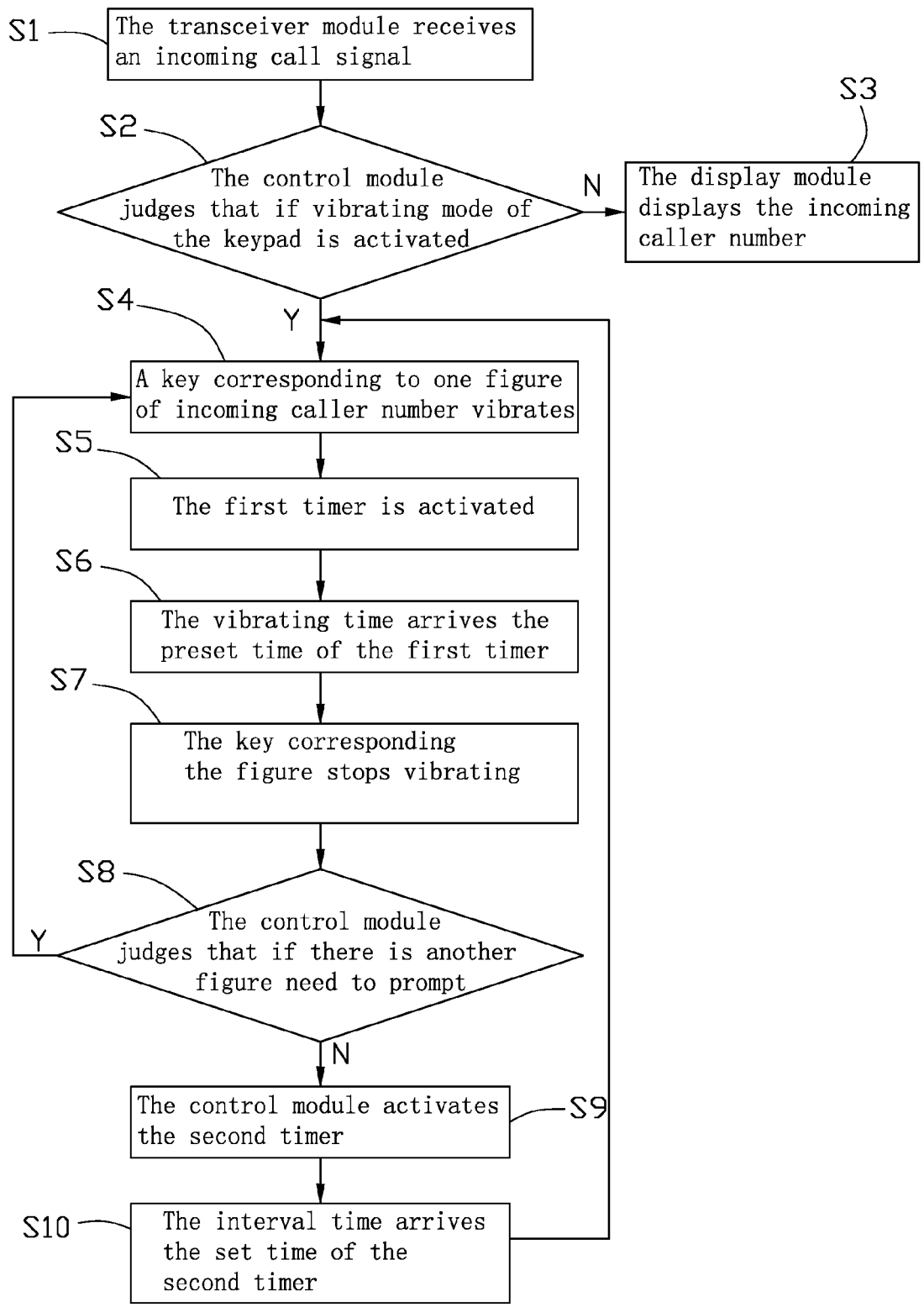
FIG. 2 is a flow chart of an incoming caller number prompt process of the mobile communication device shown in FIG. 1.

Referring to FIG. 2, the process of the incoming caller number prompt method of the mobile communication device 100 may include the following steps:

In step S1, the transceiver module 11 receives an incoming call signal, and sends the incoming call signal to the control module 14.

In step S2, after the control module 14 receives the incoming call signal, the control module 14 judges whether the vibrating mode of the keypad 15 is activated. If the vibrating mode is not activated, the process continues by going to step S3, where the control module 14 sends the incoming call signal to the display module 12, causing the display module 12 to display the incoming caller number. If the vibrating mode is activated, the process continues by going to step S4, where the control module 14 controls the keys 151 associated with the symbols corresponding to the incoming caller number powered on and off to vibrate one by one in the sequence corresponding to the keys corresponding with the incoming caller number.

In step S5, the control module 14 activates the first timer 131, and the first timer 131 controls the vibrating time for each individual key 151 corresponding to a symbol of the incoming caller number.

In step S6, when the set time of the first timer 131 has arrived, the vibrating of the key 151 corresponding to a first symbol or number of the incoming caller number is finished, the first timer 131 sends an intermit signal to the control module 14.

In step S7, the control module 14 control the switch module 16 to disconnect to the power 17, so that the key 151 corresponding the symbol stops vibrating.

In step S8, the control module 14 judges that if there are other keys corresponding to a symbol of the incoming caller number that needs prompting by vibrating. If there is, the process returns to step S4. If there is not, the process goes to step S9.

In step S9, the control module 14 activates the second timer 132, and the second timer 132 start to time to control the interval before the keys 151 corresponding to all symbols of the incoming caller number are vibrated again.

In step S10, when the interval time arrives the set time of the second timer 132, return to step S4 to start the next turn of vibrating.

Figure 3:
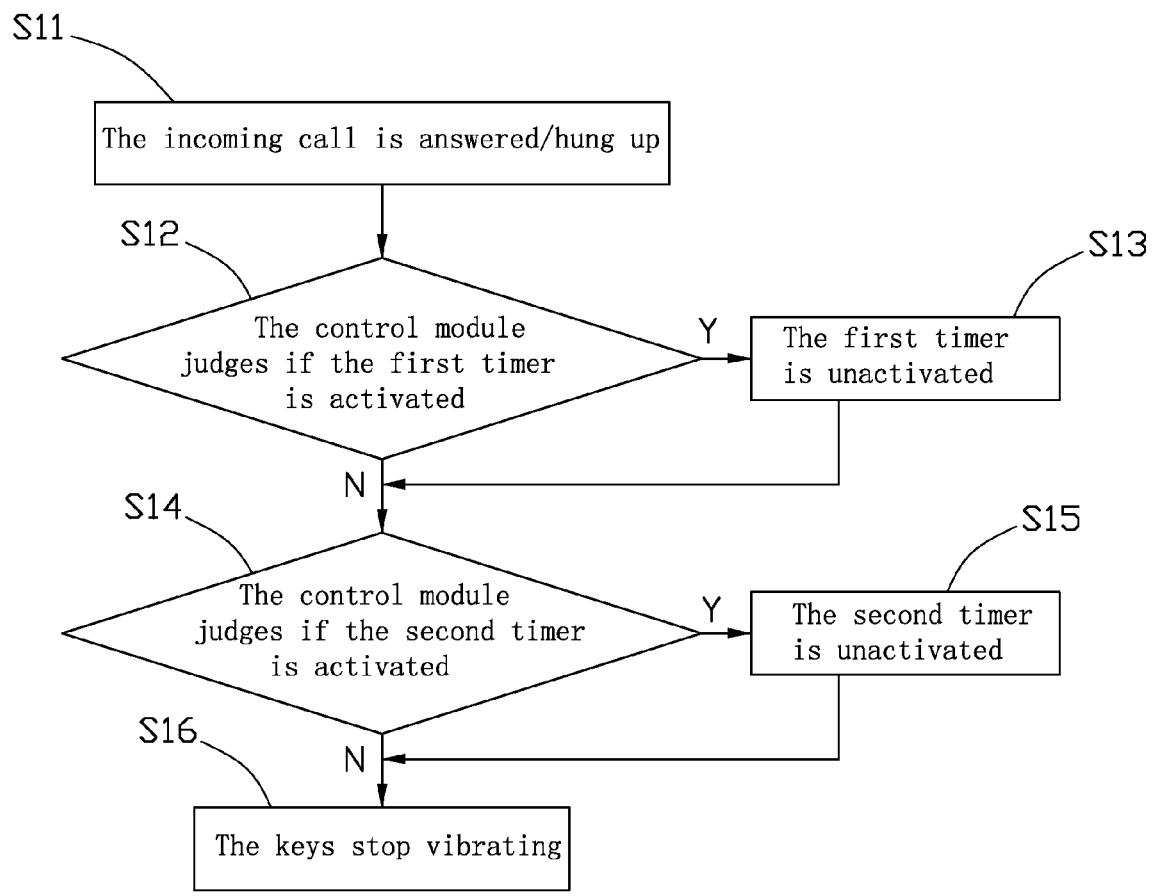
FIG. 3 is a work flow chart of the mobile communication device shown in FIG. 1 when a call is answered/hung up.

Referring to FIG. 3, in any step of the vibrating process shown in FIG. 2, if a user answers or hangs up the incoming call, the mobile communication device 100 may do the following:.

In step S11, when the incoming call is answered or hung up, then the control module 14 receives an intermit signal. In step S12, the control module 14 judges if the first timer 131 is activated, if yes, go to step S13; if no, go to step S14. In step S13, the control module 14 deactivates the first timer 131. In step S14, the control module 14 judges if the second timer 132 is activated, if yes, go to step S15; if not, go to step S16. In step S15, the control module 14 deactivates the second timer 132. In step S16, the control module 14 controls the switch module 16 to disconnect to the power 17, the keys 151 stop vibrating.

It should be understood that, the control module 14 can preset the activating times of the second timer 132. When a call is coming, and the activating times of the second timer 132 in the process of vibrating arrives the preset times, if the call has not been answered or hung up by the user, the control module 14 controls the switch module disconnect to the power 17 to stop the keys 151 vibrating.

One main advantage of the present exemplary embodiment is that the incoming caller number can be prompted by keys 151 vibrating, so that a user can conveniently obtain the incoming caller number by feeling the vibrating keys 151, without viewing the LCD.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile communication device, comprising:
    a transceiver module used for receiving an incoming caller number;
    a switch module;
    a power source;
    a keypad electronically connected to both the switch module and the power source, the keypad including a plurality of keys electronically connected to the switch module;
    a control module electronically connected to the transceiver module, the switch module and the keypad, the control module controlling the switch module to make the keys corresponding to the incoming caller number vibrate to prompt the incoming caller number; and
    a timing module electronically connected to the control module, the timing module controlling the vibrating time of the keys corresponding to the incoming caller number and an interval between two periods of the keypad vibrating all the keys corresponding to the incoming caller number.

2. The mobile communication device as claimed in claim 1, wherein the timing module includes a first timer electronically connected to the control module, the first timer controlling the vibrating time of the keys corresponding to each key corresponding to the incoming caller number.

3. The mobile communication device as claimed in claim 2, wherein the timing module further includes a second timer electronically connected to the control module, the second timer controlling an interval between two periods of the keypad vibrating all the keys corresponding to the incoming caller number.

4. The mobile communication device as claimed in claim 1, further comprising a display module used for displaying the incoming caller number, the display module electronically connected to the control module.

5. An incoming caller number prompt method of a mobile communication device, comprising:
    receiving an incoming call number;
    judging whether a vibrating mode of the keypad is activated;
    if the vibrating mode of the keypad is activated, vibrating a key corresponding to one number of the incoming caller number for a predetermined time;
    determining whether another number of the incoming call number needs to be prompted;
    if another number of the incoming call number needs to be prompted, waiting a predetermined time and causing the key corresponding to the number to vibrate; and
    if there is no other number of the incoming call number needing to be prompted, waiting a predetermined time, and causing the keys to repeat the vibrating process.

6. The incoming caller number prompt method as claimed in claim 5, further comprising determining if the incoming call is answered or hung up, judging whether a first timer and a second timer of the mobile communication device for controlling the vibrating time of the keys corresponding to the incoming caller number and an interval between two periods of the keypad vibrating all the keys corresponding to the incoming caller number, respectively, are activated, and if activated, deactivating the first timer and the second timer.

7. The incoming caller number prompt method as claimed in claim 5, further comprising: if the vibrating mode of the keypad is deactivated, a display module displays the incoming caller number.

* * * * *